Sept. 6, 1949.                R. L. KAYE                2,481,225
                         FOG PENETRATING DEVICE
                         Filed March 7, 1947

Inventor

ROBERT LEE KAYE.

By Lippincott and Moore

Attorneys

Patented Sept. 6, 1949

2,481,225

UNITED STATES PATENT OFFICE 2,481,225

FOG PENETRATING DEVICE

Robert Lee Kaye, Newark, N. J.

Application March 7, 1947, Serial No. 733,242

3 Claims. (Cl. 315—82)

The present invention concerns improvements in a fog penetrating device.

It is an object of the invention to provide means for producing intermittent light of long wavelength to eliminate the glare resulting from dispersion of light from a vehicular lamp.

It is an object of the invention to utilize the relatively high illumination contrast between light absorbing and light reflecting bodies. When light falls initially upon an object there is a certain time lag before any light at all is reflected because all bodies absorb energy. The energy level at which no energy is reflected is low for most bodies. It would theoretically be zero for a perfect reflector and infinite for a true black body absorber. The small fraction of time during which this effect occurs is negligible for bodies under steady illumination. Where, however, the lighting is intermittent and the interval of illumination is quite short, the time differential between the beginning of visible reflection of highly reflecting bodies or surfaces and highly absorbent or transparent ones can become significant as the period of illumination decreases. At about twelve cycles per second it is now believed that this effect is maximized. As the frequency passes sixteen cycles per second the lag in reaction of the retina causes a persistency of vision, which begins to give the effect of continuous illumination. Thirty cycle flicker is noticeable and can be highly irritating, but as far as is known does not increase the visibility of contrasting objects over continuous illumination. The eye detects no difference between sixty cycles illumination and d./c. illumination, though here the additional factor of heat retention by the lamp filament is an additional element which helps to smooth out the light level curve.

The effect of intermittent illumination at about ten to twelve cycles per second is to emphasize the contrast between highly reflecting surfaces and those which have a longer absorbing period before visible reflection occurs. The increase in effective contrast is appreciable. The eye can adjust itself to a wide range in level of illumination and is most sensitive to contrasts.

Fog absorbs light, diffuses it, and decreases the lighting contrasts by which objects are distinguished. Much the same effect is caused by a dirty windshield on a car. The undesirable effect, however, is immeasurably heightened by sunlight shining on such a windshield. It is important to note that the presence or absence of the sunshine directly upon the dirty windshield does not affected the amount of reflected light, from the object being viewed, that is transmitted by the windshield. Such sunlight however does greatly decrease the contrast and makes objects exceedingly difficult to distinguish under these conditions.

Reference is had to the drawings in which like numbers refer to like parts throughout.

Figure 1:
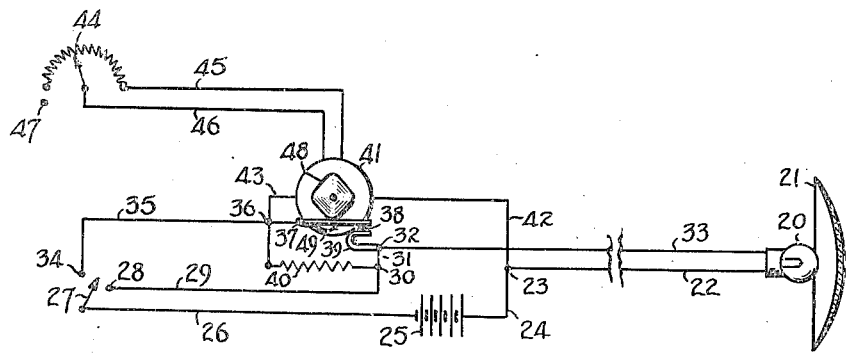
Fig. 1 is a schematic diagram of one form of the invention.

A vehicular lamp bulb 20 is mounted behind an amber or similarly tinted lense 21. Lense 21 may be of light polarizing material if desired. The normal operating circuit for lamp 20 is wire 22, junction 23, wire 24, battery 25, wire 26, dash lamp switch 27, terminal 28, wire 29, junction 30, wire 31, junction 32, and wire 33 to the other side of lamp 20.

When the illumination from lamp 20 is desired to be intermittent switch 27 is thrown to terminal 34 and the lamp circuit then leads through wire 35, junction 36, movable arm 37, contact point 38 mounted on curved resilient arm 39, junction 32 and wire 33 to lamp 20.

A relatively high ohmage resistor 40 is connected between junctions 30 and 36 and in parallel with movable arm 37, contact point 38 and curved resilient arm 39. Motor 41 is connected to junction 23 by wire 42 and to junction 36 by wire 43. Motor 41 is controlled by rheostat 44 which is connected to the motor 41 by wires 45 and 46. Rheostat 44 has a zero terminal 47 which breaks the line connection to motor 41 so that there is no current flowing through resistor 40 when switch 27 is on terminal 28.

A multiple event cam 48 is mounted on the shaft of motor 41 and is so positioned that the dwells of the cam permit arm 37 to rise under the action of spring 49 and break contact with point 38. When contact 38 is broken resistor 40 is placed in series with lamp 20 which dims to a point where little or no visible light is emitted. The rise of cam 48 causes arm 37 to move into contact with arm 39 at point 38 and shunts resistor 40, causing lamp 20 to glow. Rheostat 44 controls the speed of rotation of motor 41 so that the cycle of flash of lamp 20 may be varied from one cycle per second to thirty cycles per second.

When switch 27 is closed on terminal 28 the lamp 20 lights normally. When switch 27 is closed on terminal 34 lamp 20 may or may not light depending upon whether or not contact 38 is closed. When rheostat 44 is cut in motor 41 rotates cam 48 and lamp 20 flashes as resistor 40 is alternately cut in and shunted out of the lamp circuit.

Figure 2:
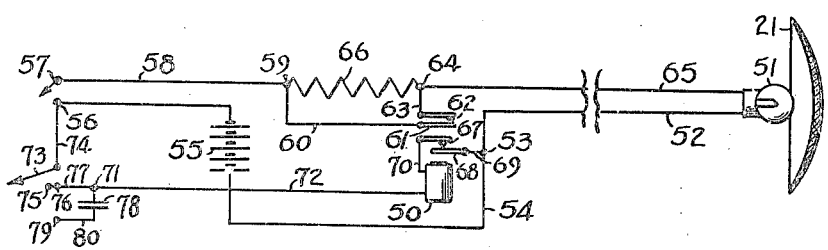
Fig. 2 is a schematic diagram of another form of the invention.

The form of the invention shown in Fig. 2 employs a vibro-pack 50 to break the lamp circuit. The normal circuit of lamp 51 is wire 52, junction 53, wire 54, battery 55, junction 56, lamp dash switch 57, wire 58, junction 59, wire 60, movable arm 61, contact point 62, wire 63, junction 64, and wire 65. A resistor 66, similar to resistor 40, joins junction 59 and 64.

Buzzer contacts 67 of vibro-pack 50 have movable arm 68 connected to junction 53 by wire 69. The other arm is connected to the winding of vibro-pack 50 by wire 70. Vibro-pack 50 is connected to junction 71 by wire 72. Switch 73 is connected to junction 56 by wire 74 and is provided with three terminals.

Terminals 75 and 76 are connected to junction 71 by wire 77. A condenser 78 is connected to junction 71 and terminal 79 of switch 73 by wire 80. The movable arm of switch 73 is so constructed that when moved into contact with terminal 75 vibro-pack 50 is placed across battery 55 and attracts both arms 61 and 68. Arm 61 breaks the shunt circuit around resistor 66 and places it in series with lamp 20. Arm 68 breaks the circuit of vibro-pack 50 and permits both sets of contacts 62 and 67 to close. When contact 67 closes vibro-pack 50 is again energized and the cycle repeated.

Switch 73 may be placed across terminals 76 and 79 simultaneously. The operation is the same as before, but slower depending upon the R. C. time constant of condenser 78. Condenser 78 may be variable if desired. Normally an electrolytic condenser would be used. Switch 57 is the usual dash light switch and must be closed for lamp 20 to light at all.

While the device is primarily intended for use on automobiles and airplanes other uses will suggest themselves.

The above disclosure is illustrative of two forms the invention may take and is not intended to be limiting.

I claim:

1. The combination of a vehicle with a lamp mounted thereon and positioned to illuminate the path of said vehicle, cyclically operable means controlling the effective illumination of the vehicle path by said lamp and causing said illumination to vary sufficiently in amplitude and at a cyclic rate to maximize the contrast between illuminated objects which are relatively good reflectors of incident light and illuminated objects which are relatively good absorbers thereof.

2. The combination set forth in claim 1, said means comprising a supply circuit for said lamp having a variable impedance means therein.

3. In combination, a vehicle, a lamp having a reflector mounted thereon and positioned to illuminate the path of said vehicle, cyclically operable means controlling the effective level of illumination of the vehicle path by said lamp and causing said illumination to vary in amplitude at a cyclic rate to maximize the contrast between illuminated objects which are relatively good reflectors of incident light and illuminated objects which are relatively good absorbers thereof, said means comprising a supply circuit for said lamp and a switch means to change the circuit characteristics.

ROBERT LEE KAYE.

REFERENCES CITED

The following references are of record in the file of this patent:

UNITED STATES PATENTS

| Number | Name | Date |
|---|---|---|
| 976,287 | Phelps | Nov. 22, 1910 |
| 2,132,097 | Bryant | Oct. 4, 1938 |
| 2,139,160 | Hebeler | Dec. 6, 1938 |
| 2,335,076 | Neumueller | Nov. 23, 1943 |
| 2,407,113 | Tuck | Sept. 3, 1946 |
| 2,419,432 | Wright | Apr. 22, 1947 |